US012694152B2

(12) United States Patent (10) Patent No.: US 12,694,152 B2
Nguyen et al. (45) Date of Patent: Jul. 28, 2026

(54) INFORMATION PROCESSING SYSTEM, INFORMATION PROCESSING METHOD, AND NON-TRANSITORY COMPUTER READABLE STORAGE MEDIUM

(71) Applicant: RAKUTEN GROUP, INC., Tokyo (JP)

(72) Inventors: Minh The Nguyen, Tokyo (JP); Tu Tuan Tran, Tokyo (JP); Thuan Duc Ngo, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 27 days.

(21) Appl. No.: 18/932,641

(22) Filed: Oct. 31, 2024

(65) Prior Publication Data

US 2025/0139290 A1 May 1, 2025

(30) Foreign Application Priority Data

Oct. 31, 2023 (JP) ................................. 2023-186945

(51) Int. Cl.
*G06F 21/62* (2013.01)
(52) U.S. Cl.
CPC ................................. *G06F 21/6254* (2013.01)
(58) Field of Classification Search
CPC ...... G06F 21/6254; G06F 9/46; G06F 16/258; H04L 63/08; H04L 9/32
See application file for complete search history.

(56) References Cited

U.S. PATENT DOCUMENTS

| | | | |
|---|---|---|---|
| 10,601,786 B2 * | 3/2020 | Whaley | H04L 9/0819 |
| 11,430,434 B1 * | 8/2022 | Milstein | G10L 15/08 |
| 2007/0214473 A1 * | 9/2007 | Barton | H04N 21/4751 |
| | | | 725/31 |
| 2010/0146583 A1 * | 6/2010 | Prehofer | G06Q 30/02 |
| | | | 726/1 |

(Continued)

FOREIGN PATENT DOCUMENTS

| | | |
|---|---|---|
| JP | 2011145802 A | 7/2011 |
| JP | 2020109592 A | 7/2020 |

(Continued)

OTHER PUBLICATIONS

Office Action of Oct. 22, 2024, for corresponding JP application No. 2023-186945 with English translation, pp. 1-9.

(Continued)

*Primary Examiner* — Khalid M Almaghayreh
(74) *Attorney, Agent, or Firm* — HEA Law PLLC

(57) ABSTRACT

Provided is an information processing system configured to: acquire an inquiry including one or more pieces of privacy information based on input from a user; replace each of the one or more pieces of privacy information included in the inquiry with masked information different from the one or more pieces of privacy information; request a language model to create an answer to the inquiry in which the privacy information has been replaced, and acquire the answer from the language model; replace the masked information included in the acquired answer with the privacy information which has been replaced with the masked information (Continued)

in the inquiry; and transmit information based on the answer in which the masked information has been replaced to the user.

11 Claims, 13 Drawing Sheets

(56)                References Cited

U.S. PATENT DOCUMENTS

| | | | | |
|---|---|---|---|---|
| 2010/0191600 | A1* | 7/2010 | Sideman | G06Q 30/0275 |
| | | | | 705/14.71 |
| 2015/0320362 | A1* | 11/2015 | Hasegawa | A61B 5/08 |
| | | | | 600/529 |
| 2016/0085982 | A1* | 3/2016 | Guirguis | G06F 16/283 |
| | | | | 726/26 |
| 2018/0255023 | A1* | 9/2018 | Whaley | H04L 63/0421 |
| 2020/0125967 | A1* | 4/2020 | Seo | G06N 5/022 |
| 2020/0218728 | A1* | 7/2020 | Kuroda | G06N 20/00 |
| 2021/0158129 | A1* | 5/2021 | Srivastava | G06N 3/0499 |
| 2023/0163978 | A1* | 5/2023 | Turner | H04L 9/083 |
| | | | | 713/168 |
| 2024/0194341 | A1* | 6/2024 | Van Der Linden | G06N 3/0985 |

FOREIGN PATENT DOCUMENTS

| | | |
|---|---|---|
| JP | 2023073095 A | 5/2023 |
| JP | 7313757 B1 | 7/2023 |

OTHER PUBLICATIONS

Office Action of Mar. 10, 2026, for corresponding JP Patent Application No. 2025-065186 with English translation, pp. 1-8.

* cited by examiner

FIG.3

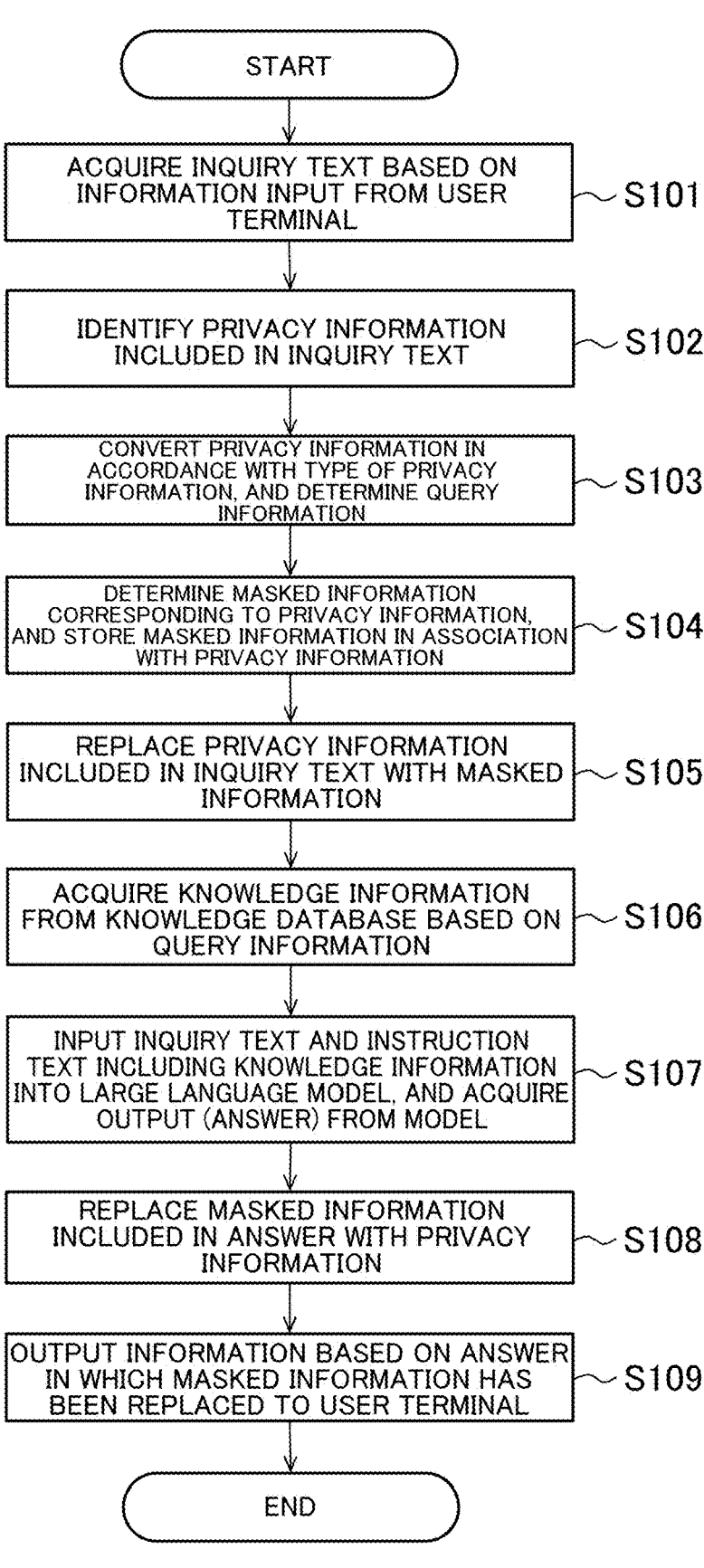

START

ACQUIRE INQUIRY TEXT BASED ON
INFORMATION INPUT FROM USER
TERMINAL ～S101

IDENTIFY PRIVACY INFORMATION
INCLUDED IN INQUIRY TEXT ～S102

CONVERT PRIVACY INFORMATION IN
ACCORDANCE WITH TYPE OF PRIVACY
INFORMATION, AND DETERMINE QUERY
INFORMATION ～S103

DETERMINE MASKED INFORMATION
CORRESPONDING TO PRIVACY INFORMATION,
AND STORE MASKED INFORMATION IN ASSOCIATION
WITH PRIVACY INFORMATION ～S104

REPLACE PRIVACY INFORMATION
INCLUDED IN INQUIRY TEXT WITH MASKED
INFORMATION ～S105

ACQUIRE KNOWLEDGE INFORMATION
FROM KNOWLEDGE DATABASE BASED ON
QUERY INFORMATION ～S106

INPUT INQUIRY TEXT AND INSTRUCTION
TEXT INCLUDING KNOWLEDGE INFORMATION
INTO LARGE LANGUAGE MODEL, AND ACQUIRE
OUTPUT (ANSWER) FROM MODEL ～S107

REPLACE MASKED INFORMATION
INCLUDED IN ANSWER WITH PRIVACY
INFORMATION ～S108

OUTPUT INFORMATION BASED ON ANSWER
IN WHICH MASKED INFORMATION HAS
BEEN REPLACED TO USER TERMINAL ～S109

END

FIG.4

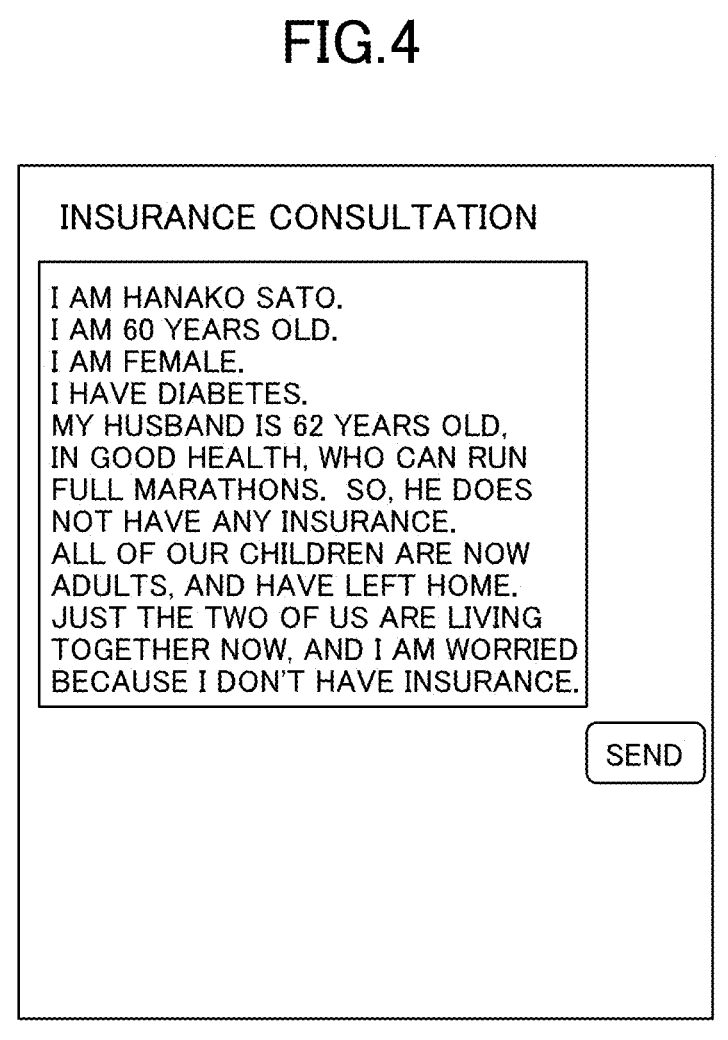

INSURANCE CONSULTATION

I AM HANAKO SATO.
I AM 60 YEARS OLD.
I AM FEMALE.
I HAVE DIABETES.
MY HUSBAND IS 62 YEARS OLD,
IN GOOD HEALTH, WHO CAN RUN
FULL MARATHONS.  SO, HE DOES
NOT HAVE ANY INSURANCE.
ALL OF OUR CHILDREN ARE NOW
ADULTS, AND HAVE LEFT HOME.
JUST THE TWO OF US ARE LIVING
TOGETHER NOW, AND I AM WORRIED
BECAUSE I DON'T HAVE INSURANCE.

SEND

FIG.5

| field | value |
|---|---|
| Name | HANAKO SATO |
| Age | 60 |
| Gender | FEMALE |
| Disease | DIABETES |
| . . . | . . . |

FIG.6

| field | value |
|---|---|
| age_range | range_60_to_69 |
| gender_code | 2 |
| disease_code | 12 |
| . . . | . . . |

FIG.7

| relation | field | original_value | encoded_value |
|---|---|---|---|
| self | name | HANAKO SATO | YUMIKO SUZUKI |
| self | age | 60 | 63 |
| self | gender | FEMALE | FEMALE |
| self | disease | DIABETES | DIABETES |
| self | marital_status | MARRIED | MARRIED |
| self | phone_number | 090-6789-9876 | 090-0000-0000 |
| husband | name | ICHIRO SATO | TARO SUZUKI |
| husband | age | 62 | 66 |
| husband | gender | MALE | MALE |
| husband | disease | (null) | (null) |
| husband | marital_status | MARRIED | MARRIED |
| husband | phone_number | (null) | (null) |

FIG.8

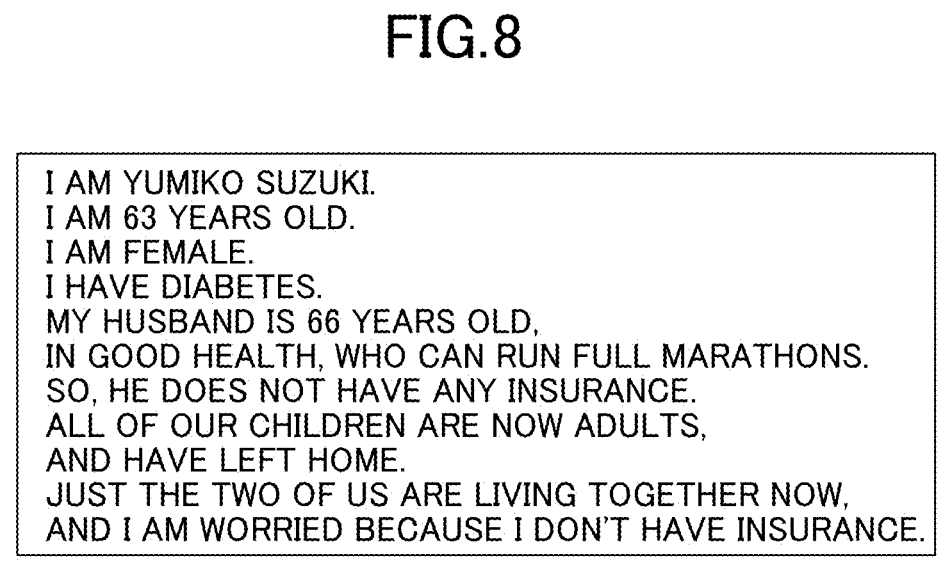

I AM YUMIKO SUZUKI.
I AM 63 YEARS OLD.
I AM FEMALE.
I HAVE DIABETES.
MY HUSBAND IS 66 YEARS OLD,
IN GOOD HEALTH, WHO CAN RUN FULL MARATHONS.
SO, HE DOES NOT HAVE ANY INSURANCE.
ALL OF OUR CHILDREN ARE NOW ADULTS,
AND HAVE LEFT HOME.
JUST THE TWO OF US ARE LIVING TOGETHER NOW,
AND I AM WORRIED BECAUSE I DON'T HAVE INSURANCE.

FIG.9

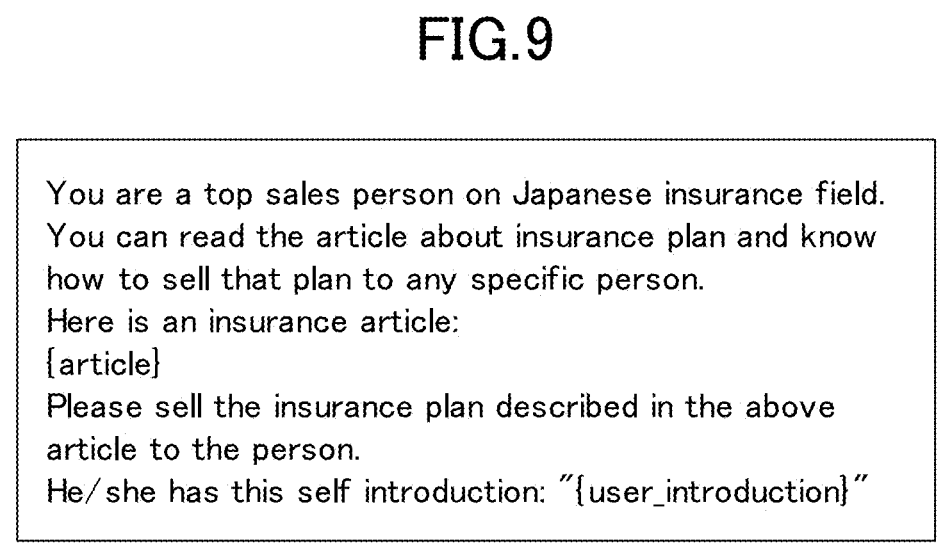

You are a top sales person on Japanese insurance field.
You can read the article about insurance plan and know
how to sell that plan to any specific person.
Here is an insurance article:
{article}
Please sell the insurance plan described in the above
article to the person.
He/she has this self introduction: "{user_introduction}"

FIG.10

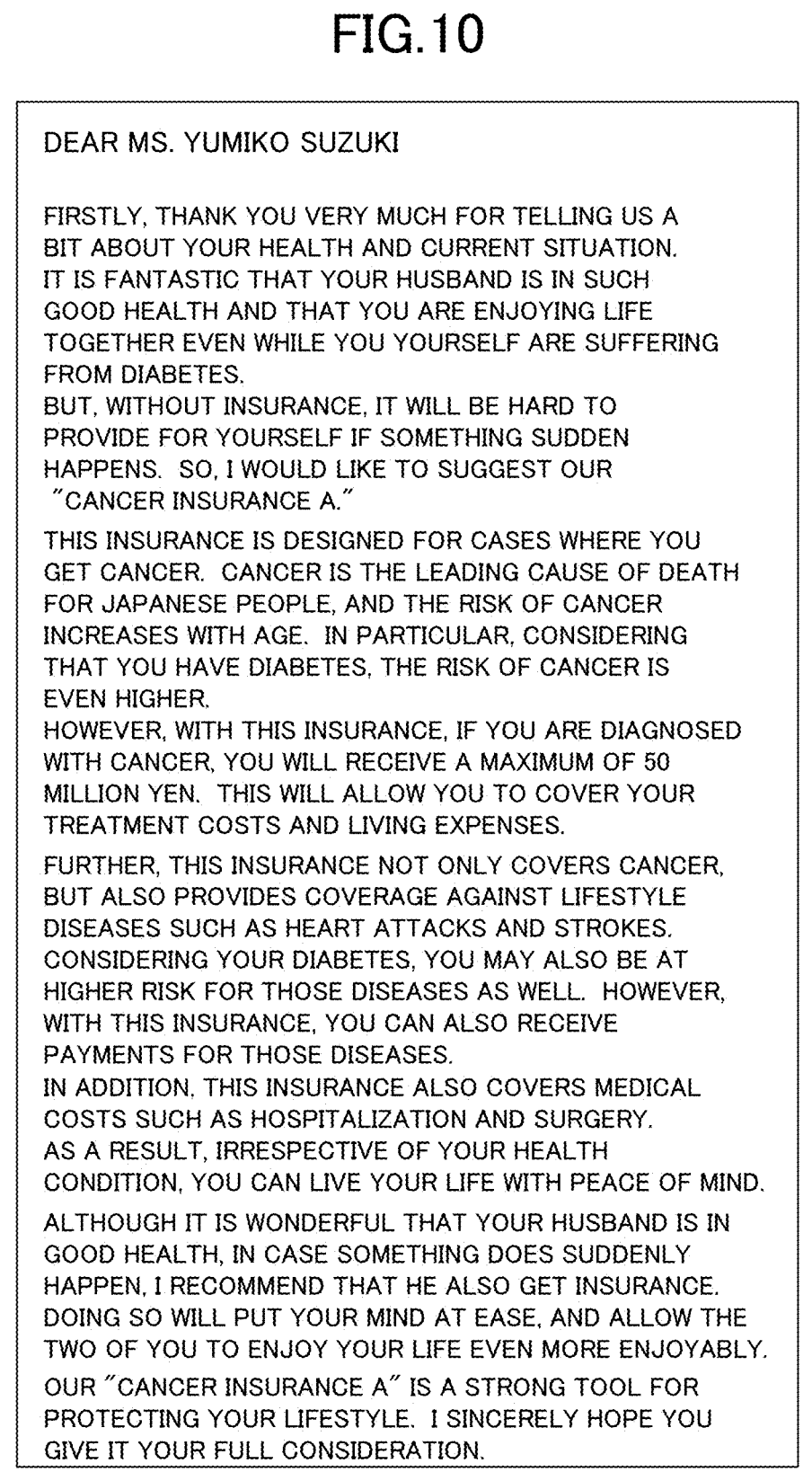

DEAR MS. YUMIKO SUZUKI

FIRSTLY, THANK YOU VERY MUCH FOR TELLING US A
BIT ABOUT YOUR HEALTH AND CURRENT SITUATION.
IT IS FANTASTIC THAT YOUR HUSBAND IS IN SUCH
GOOD HEALTH AND THAT YOU ARE ENJOYING LIFE
TOGETHER EVEN WHILE YOU YOURSELF ARE SUFFERING
FROM DIABETES.
BUT, WITHOUT INSURANCE, IT WILL BE HARD TO
PROVIDE FOR YOURSELF IF SOMETHING SUDDEN
HAPPENS. SO, I WOULD LIKE TO SUGGEST OUR
"CANCER INSURANCE A."

THIS INSURANCE IS DESIGNED FOR CASES WHERE YOU
GET CANCER. CANCER IS THE LEADING CAUSE OF DEATH
FOR JAPANESE PEOPLE, AND THE RISK OF CANCER
INCREASES WITH AGE. IN PARTICULAR, CONSIDERING
THAT YOU HAVE DIABETES, THE RISK OF CANCER IS
EVEN HIGHER.
HOWEVER, WITH THIS INSURANCE, IF YOU ARE DIAGNOSED
WITH CANCER, YOU WILL RECEIVE A MAXIMUM OF 50
MILLION YEN. THIS WILL ALLOW YOU TO COVER YOUR
TREATMENT COSTS AND LIVING EXPENSES.

FURTHER, THIS INSURANCE NOT ONLY COVERS CANCER,
BUT ALSO PROVIDES COVERAGE AGAINST LIFESTYLE
DISEASES SUCH AS HEART ATTACKS AND STROKES.
CONSIDERING YOUR DIABETES, YOU MAY ALSO BE AT
HIGHER RISK FOR THOSE DISEASES AS WELL. HOWEVER,
WITH THIS INSURANCE, YOU CAN ALSO RECEIVE
PAYMENTS FOR THOSE DISEASES.
IN ADDITION, THIS INSURANCE ALSO COVERS MEDICAL
COSTS SUCH AS HOSPITALIZATION AND SURGERY.
AS A RESULT, IRRESPECTIVE OF YOUR HEALTH
CONDITION, YOU CAN LIVE YOUR LIFE WITH PEACE OF MIND.

ALTHOUGH IT IS WONDERFUL THAT YOUR HUSBAND IS IN
GOOD HEALTH, IN CASE SOMETHING DOES SUDDENLY
HAPPEN, I RECOMMEND THAT HE ALSO GET INSURANCE.
DOING SO WILL PUT YOUR MIND AT EASE, AND ALLOW THE
TWO OF YOU TO ENJOY YOUR LIFE EVEN MORE ENJOYABLY.

OUR "CANCER INSURANCE A" IS A STRONG TOOL FOR
PROTECTING YOUR LIFESTYLE. I SINCERELY HOPE YOU
GIVE IT YOUR FULL CONSIDERATION.

FIG.11

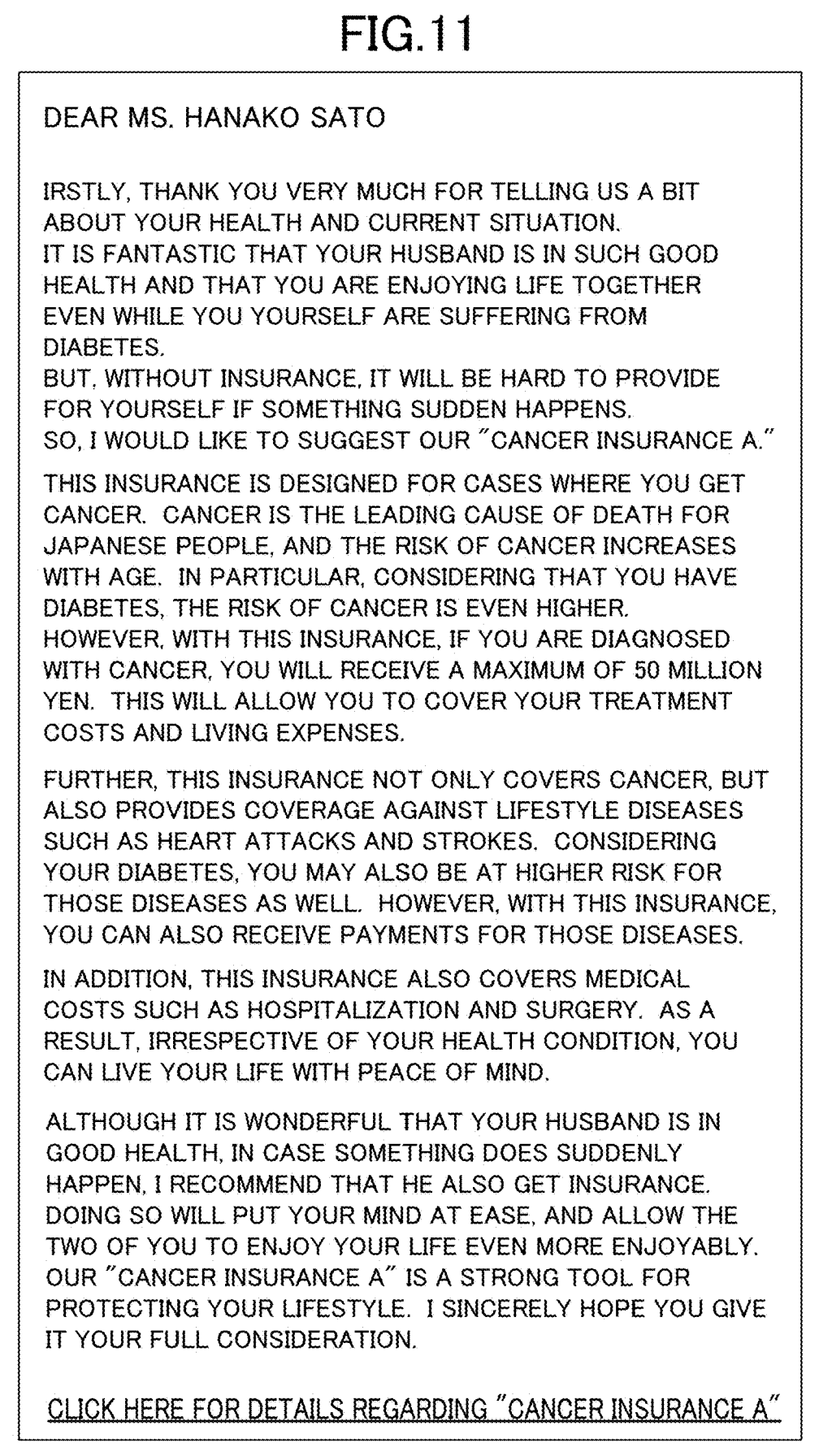

DEAR MS. HANAKO SATO

IRSTLY, THANK YOU VERY MUCH FOR TELLING US A BIT ABOUT YOUR HEALTH AND CURRENT SITUATION.
IT IS FANTASTIC THAT YOUR HUSBAND IS IN SUCH GOOD HEALTH AND THAT YOU ARE ENJOYING LIFE TOGETHER EVEN WHILE YOU YOURSELF ARE SUFFERING FROM DIABETES.
BUT, WITHOUT INSURANCE, IT WILL BE HARD TO PROVIDE FOR YOURSELF IF SOMETHING SUDDEN HAPPENS.
SO, I WOULD LIKE TO SUGGEST OUR "CANCER INSURANCE A."

THIS INSURANCE IS DESIGNED FOR CASES WHERE YOU GET CANCER. CANCER IS THE LEADING CAUSE OF DEATH FOR JAPANESE PEOPLE, AND THE RISK OF CANCER INCREASES WITH AGE. IN PARTICULAR, CONSIDERING THAT YOU HAVE DIABETES, THE RISK OF CANCER IS EVEN HIGHER. HOWEVER, WITH THIS INSURANCE, IF YOU ARE DIAGNOSED WITH CANCER, YOU WILL RECEIVE A MAXIMUM OF 50 MILLION YEN. THIS WILL ALLOW YOU TO COVER YOUR TREATMENT COSTS AND LIVING EXPENSES.

FURTHER, THIS INSURANCE NOT ONLY COVERS CANCER, BUT ALSO PROVIDES COVERAGE AGAINST LIFESTYLE DISEASES SUCH AS HEART ATTACKS AND STROKES. CONSIDERING YOUR DIABETES, YOU MAY ALSO BE AT HIGHER RISK FOR THOSE DISEASES AS WELL. HOWEVER, WITH THIS INSURANCE, YOU CAN ALSO RECEIVE PAYMENTS FOR THOSE DISEASES.

IN ADDITION, THIS INSURANCE ALSO COVERS MEDICAL COSTS SUCH AS HOSPITALIZATION AND SURGERY. AS A RESULT, IRRESPECTIVE OF YOUR HEALTH CONDITION, YOU CAN LIVE YOUR LIFE WITH PEACE OF MIND.

ALTHOUGH IT IS WONDERFUL THAT YOUR HUSBAND IS IN GOOD HEALTH, IN CASE SOMETHING DOES SUDDENLY HAPPEN, I RECOMMEND THAT HE ALSO GET INSURANCE. DOING SO WILL PUT YOUR MIND AT EASE, AND ALLOW THE TWO OF YOU TO ENJOY YOUR LIFE EVEN MORE ENJOYABLY. OUR "CANCER INSURANCE A" IS A STRONG TOOL FOR PROTECTING YOUR LIFESTYLE. I SINCERELY HOPE YOU GIVE IT YOUR FULL CONSIDERATION.

CLICK HERE FOR DETAILS REGARDING "CANCER INSURANCE A"

FIG.12

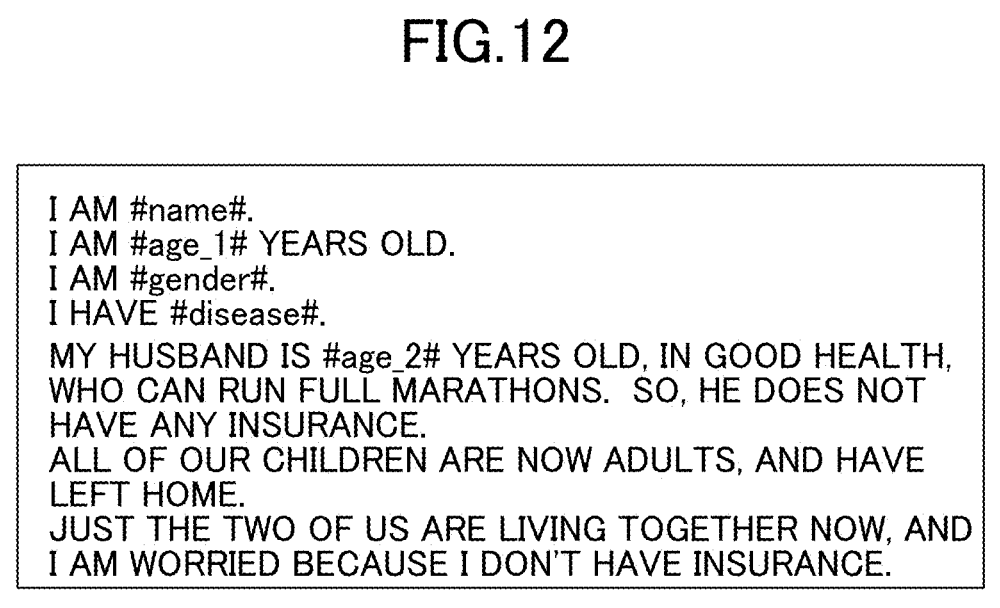

I AM #name#.
I AM #age_1# YEARS OLD.
I AM #gender#.
I HAVE #disease#.

MY HUSBAND IS #age_2# YEARS OLD, IN GOOD HEALTH,
WHO CAN RUN FULL MARATHONS.  SO, HE DOES NOT
HAVE ANY INSURANCE.
ALL OF OUR CHILDREN ARE NOW ADULTS, AND HAVE
LEFT HOME.
JUST THE TWO OF US ARE LIVING TOGETHER NOW, AND
I AM WORRIED BECAUSE I DON'T HAVE INSURANCE.

FIG.13

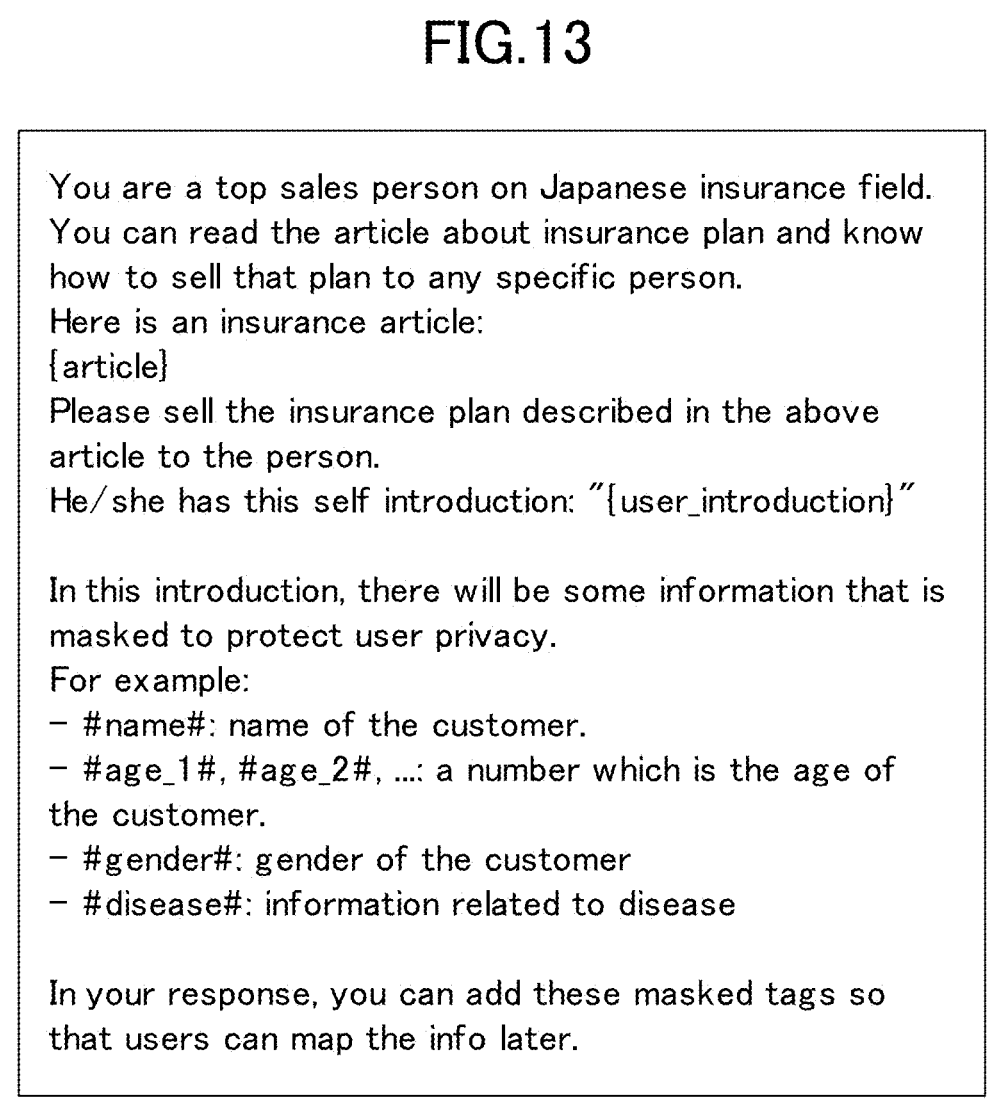

You are a top sales person on Japanese insurance field.
You can read the article about insurance plan and know
how to sell that plan to any specific person.
Here is an insurance article:
{article}
Please sell the insurance plan described in the above
article to the person.
He/she has this self introduction: "{user_introduction}"

In this introduction, there will be some information that is
masked to protect user privacy.
For example:
- #name#: name of the customer.
- #age_1#, #age_2#, ...: a number which is the age of
the customer.
- #gender#: gender of the customer
- #disease#: information related to disease In your response, you can add these masked tags so
that users can map the info later.

INFORMATION PROCESSING SYSTEM, INFORMATION PROCESSING METHOD, AND NON-TRANSITORY COMPUTER READABLE STORAGE MEDIUM

CROSS-REFERENCE TO RELATED APPLICATION

The present application claims priority from Japanese patent application JP2023-186945 filed on Oct. 31, 2023, the content of which is hereby incorporated by reference into this application.

BACKGROUND OF THE INVENTION

1. Field of the Invention

The present invention relates to an information processing system, an information processing method, and a program.

2. Description of the Related Art

The performance of language models such as large language models (LLMs) is significantly improving. Large language models can answer questions in natural sentences. Large language models are used, for example, in chatbots such as ChatGPT (trademark).

In Japanese Patent Application Laid-open No. 2023-73095, a technology which uses a large language model obtained through machine learning of a massive amount of unlabeled text to generate a summary desired by a user is disclosed.

SUMMARY OF THE INVENTION

The inventors have investigated systems which answer questions by using a language model provided as a service. Depending on the physical arrangement of such a language model and the policy of a service provider, it may be difficult to input information relating to the protection of privacy of an individual. Meanwhile, when such information is not input into the language model, the quality of the answers output by the language model may deteriorate.

The present disclosure provides a technology for improving the quality of an answer based on an output of a language model while considering the protection of privacy.

(1) There is provided an information processing system including: a question acquisition means configured to acquire an inquiry including one or more pieces of privacy information based on input from a user; a masking means configured to replace each of the one or more pieces of privacy information included in the inquiry with masked information different from the one or more pieces of privacy information; an answer acquisition means configured to request a language model to create an answer to the inquiry in which each of the one or more pieces of privacy information has been replaced, and acquire the answer from the language model; a restoration means configured to replace the masked information included in the acquired answer with each of the one or more pieces of privacy information which has been replaced with the masked information in the inquiry; and an answer means configured to transmit information based on the answer in which the masked information has been replaced to the user.

(2) In the information processing system according to Item (1), the masking means is configured to replace each of the one or more pieces of privacy information included in the inquiry with masked information corresponding to a type of a corresponding one of the one or more pieces of privacy information.

(3) In the information processing system according to Item (2), the type of the one or more pieces of privacy information includes at least a part of a name, an age, a gender, and a medical history.

(4) In the information processing system according to any one of Items (1) to (3), the information processing system further includes an association management means configured to store each of the one or more pieces of privacy information in a database in association with the masked information which has replaced a corresponding one of the one or more pieces of privacy information, and the restoration means is configured to replace, when the answer includes masked information associated with any of the one or more pieces of privacy information, the masked information with a corresponding one of the one or more pieces of privacy information associated with the masked information.

(5) In the information processing system according to any one of Items (1) to (4), the information processing system further includes: a range selection means configured to select an age range to which an age of the user belongs from a plurality of age ranges determined in advance when the inquiry includes the age of the user; and an age selection means configured to select one of a plurality of ages within the selected age range as a masked age for the age of the user, and the masking means is configured to replace the age of the user included in the inquiry with the masked age for the age of the user.

(6) In the information processing system according to Item (5), the age selection means is configured to randomly select one of the plurality of ages within the selected age range as the masked age for the age of the user.

(7) In the information processing system according to Item (5) or (6), the information processing system further includes a basis acquisition means configured to acquire answer basis information based on at least a part of the one or more pieces of privacy information, the answer basis information being any of a plurality of pieces of answer basis information relating to an age range to which the age of the user belongs, and the answer acquisition means is configured to request, based on the acquired answer basis information, a language model to create an answer to a question in which each of the one or more pieces of privacy information has been replaced, and acquire the answer from the language model.

(8) There is provided an information processing method including: acquiring an inquiry including one or more pieces of privacy information based on input from a user; replacing each of the one or more pieces of privacy information included in the inquiry with masked information different from the one or more pieces of privacy information; requesting a language model to create an answer to the inquiry in which each of the one or more pieces of privacy information has been replaced, and acquiring the answer from the t language model; replacing the masked information included in the acquired answer with each of the one or more pieces of privacy information which has been replaced with the masked information in the inquiry; and transmitting information based on the answer in which the masked information has been replaced to the user.

(9) There is provided a program for causing a computer to function as: a question acquisition means configured to acquire an inquiry including one or more pieces of privacy information based on input from a user; a masking means configured to replace each of the one or more pieces of privacy information included in the inquiry with masked information different from the one or more pieces of privacy information; an answer acquisition means configured to request a language model to create an answer to the inquiry in which each of the one or more pieces of privacy information has been replaced, and acquire the answer from the language model; a restoration means configured to replace the masked information included in the acquired answer with each of the one or more pieces of privacy information which has been replaced with the masked information in the inquiry; and an answer means configured to transmit information based on the answer in which the masked information has been replaced to the user.

According to one or more embodiments of the present invention, it is possible to improve the quality of an answer based on the output of the language model while considering the protection of privacy.

BRIEF DESCRIPTION OF THE DRAWINGS

FIG. 3 is a flowchart for illustrating an example of processing by the inquiry management system.

FIG. 4 is a view for illustrating an example of an input screen to the inquiry management system.

FIG. 5 is a table for showing an example of privacy information extracted from an inquiry text.

FIG. 6 is a table for showing an example of a query based on privacy information.

FIG. 7 is a table for showing an example of a relationship between masked information and privacy information.

FIG. 8 is a view for illustrating an example of an inquiry text in which privacy information has been replaced.

FIG. 9 is a view for illustrating an example of an instruction text input into a large language model.

FIG. 10 is a view for illustrating an example of an answer output from the large language model.

FIG. 11 is a view for illustrating an example of an answer in which masked information has been replaced.

FIG. 12 is a view for illustrating another example of an inquiry text in which privacy information has been replaced.

FIG. 13 is a view for illustrating another example of an instruction text input into the large language model.

DETAILED DESCRIPTION OF THE INVENTION

Now, at least one embodiment of the present invention is described with reference to the drawings. Redundant description of components denoted by the same reference symbols is omitted.

Figure 1:
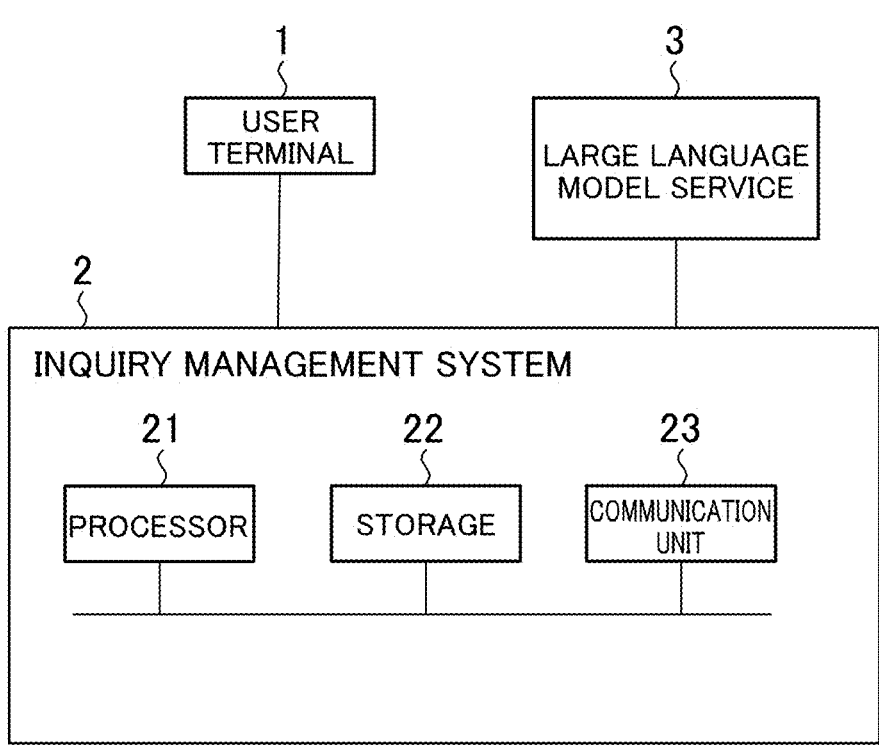
FIG. 1 is a diagram for illustrating an example of elements relating to an inquiry management system according to at least one embodiment of the present invention.

FIG. 1 is a diagram for illustrating an example of elements relating to an inquiry management system 2 according to at least one embodiment of the present invention. The inquiry management system 2 receives an inquiry including information relating to the protection of privacy of a user (privacy information) from a user terminal 1 operated by the user, inputs an instruction based on the inquiry into a large language model service 3, and outputs an answer corresponding to a text output by the large language model service 3 to the user terminal 1. In the following description, an inquiry management system 2 which is mainly for recommending an insurance product to a user is described as an example of the inquiry management system 2.

The user terminal 1 is, for example, a computer including a user interface, such as a personal computer or a smartphone.

The large language model service 3 includes a general-purpose large language model implemented by a computer. The large language model service 3 receives an instruction from the inquiry management system 2, inputs the instruction into the large language model, and passes the obtained output to the inquiry management system 2. This instruction is in a text format, and is also referred to as "prompt." In the following description, an instruction in a text format among the instructions is also referred to as "instruction text." This general-purpose large language model is trained with data from a wide range of fields. The large language model service 3 may be a service such as CHATGPT®, for example.

In the following description, when the term "large language model" is used by itself, this term refers to the large language model included in the large language model service 3. The inquiry management system 2 executes processing for inputting information into the large language model, and acquiring an output from the large language model by using an API provided by the large language model service 3. The inquiry management system 2 is not required to input all of the information in one API call, and may input the information piece by piece in a plurality of API calls. The large language model service 3 may be provided in the inquiry management system 2. In the at least one embodiment, the inquiry management system 2 inputs information for requesting the large language model to create some kind of answer, and acquires the output from the large language model as an answer. In the following description, inputting information for requesting the creation of some kind of answer into the large language model is also referred to as "requesting the large language model to create an answer."

The inquiry management system 2 includes one or more computers (for example, server computers). The inquiry management system 2 includes one or more processors 21, one or more storages 22, and one or more communication units 23. The inquiry management system 2 may include a plurality of computers each including one or more processors 21, storages 22, and communication units 23, or may include one computer including one or more processors 21 and storages 22. The inquiry management system 2 may be implemented on one or more virtual servers or container platforms.

Each processor 21 operates based on a program (also referred to as "instruction code") stored in a storage 22. The processor(s) 21 control the communication unit(s) 23. Each processor 21 includes, for example, a central processing unit (CPU), and may further include a graphic processing unit (GPU) and a neural processing unit (NPU). The above-mentioned program may be provided through, for example, the Internet, or may be provided by being stored in a flash memory, a DVD-ROM, or another computer-readable storage medium.

Each storage 22 is formed of a memory device such as a RAM or a flash memory, and an external storage device such as a hard disk drive (HDD) or a solid state drive (SSD). Each storage 22 stores the above-mentioned program. Each storage 22 also stores information and calculation results that are input from a processor 21 and a communication unit 23.

Each communication unit 23 is a communication interface, such as a network interface card, which communicates to and from other devices. Each communication unit 23 includes, for example, an integrated circuit which implements a wireless LAN or a wired LAN, an antenna, and a communication connector. Each communication unit 23 inputs information received from another device to a processor 21 and a storage 22 via a network and transmits the information to another device under the control of the processor 21.

The hardware configuration of the inquiry management system 2 is not limited to the example described above. For example, the inquiry management system 2 may include a device for reading a computer-readable information storage medium (for example, an optical disc drive or a memory card slot) and a device for inputting and outputting data to and from an external device (for example, a USB port). The external device may be an input device or an output device.

Figure 2:
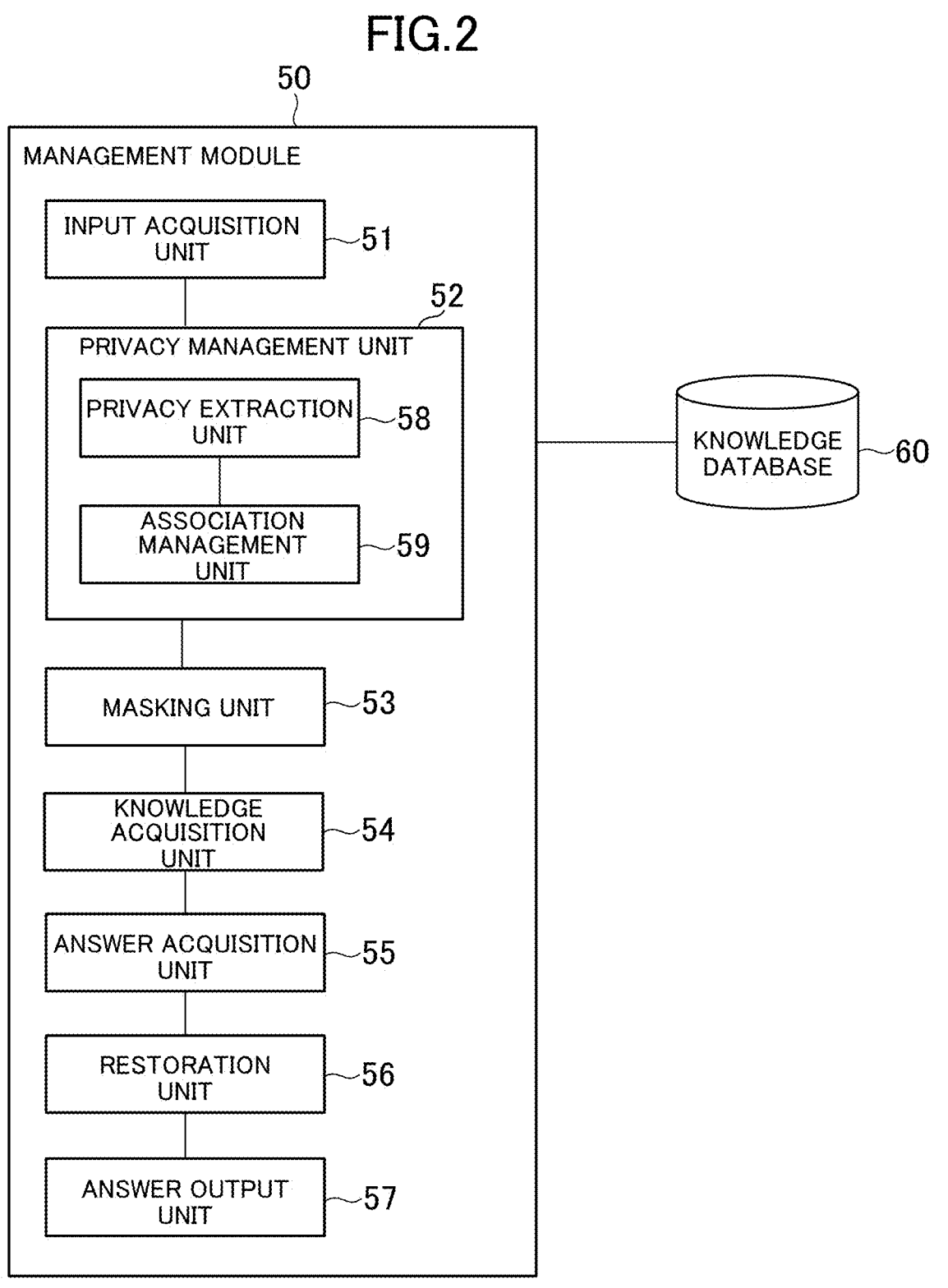
FIG. 2 is a block diagram for illustrating functions implemented by the inquiry management system.

Next, description of the functions provided by the inquiry management system 2 is given. FIG. 2 is a block diagram for illustrating functions implemented by the inquiry management system 2. The inquiry management system 2 includes, in terms of functions, a management unit 50 and a knowledge database 60. Further, the management unit 50 includes, in terms of functions, an input acquisition unit 51, a privacy management unit 52, a masking unit 53, a knowledge acquisition unit 54, an answer acquisition unit 55, a restoration unit 56, and an answer output unit 57. The privacy management unit 52 includes, in terms of functions, a privacy extraction unit 58 and an association management unit 59. The management unit 50 and the knowledge database 60 are implemented by a processor 21 executing a program corresponding to each function stored in a storage 22 and controlling a communication unit 23, for example.

The knowledge database 60 is a database in which knowledge information on a certain knowledge field is stored. The knowledge database 60 acquires, from the management unit 50, information indicating a feature of an input from the user, searches for knowledge information corresponding to the information, and passes the knowledge information found in the search to the management unit 50. In the knowledge database 60, knowledge information and feature vectors serving as an index of the knowledge information are stored in the storage 22 in association with each other. The knowledge database 60 acquires a feature vector serving as a query based on the input from the user, and acquires the knowledge information corresponding to the query.

The knowledge information may include at least a part of a text-format document and a link character string (for example, a URL) to a site on the Internet. In the at least one embodiment, the knowledge field is an insurance product sold by a certain insurance company, and the feature vector serving as the query is generated from an age group, a gender, and a medical history of the user and family members of the user. In this case, in the knowledge database 60, not only information on the insurance product as knowledge information and the feature vector of the knowledge information, but also information indicating the age group, the gender, and the medical history, which are conditions for applying the knowledge information (condition of use of the insurance product), may be stored in the storage 22 in association with each other. The knowledge database 60 may handle information on other knowledge fields as long as the knowledge is classifiable based on information relating to privacy. The knowledge information is used as information (answer basis information) to be used as a basis when the large language model creates an answer to a question.

In the search for the knowledge information, the knowledge database 60 may search for a feature vector similar to the query from a plurality of feature vectors stored in the storage 22, and output the knowledge information stored in association with the similar feature vector. Further, the query may include at least a portion of the privacy information. In this case, the knowledge database 60 may search for knowledge information having a query that satisfies the condition of use. In addition, the knowledge database 60 may search for a feature vector similar to the query from among one or more feature vectors associated with knowledge information having a query that satisfies the condition of use. The knowledge database 60 may use, for example, the cosine similarity between the feature vector of the query and the feature vector in the storage 22 as a similarity degree. The knowledge database 60 may select the feature vector having the largest similarity degree as the similar feature vector, and acquire the knowledge information associated with the selected feature vector.

The feature vector may be generated by a feature extraction model, which is a machine learning model. The feature extraction model is trained through use of document data for training. During training, the feature extraction model extracts the feature vector of a query and the feature vector of document data corresponding to the query. The training of the feature extraction model is performed such that the similarity degree between the feature vector of the query and the feature vector of the corresponding document data increases, and the similarity degree for non-corresponding document data decreases. The document data for training may be only the portion of the knowledge document which corresponds to the topic or the question. The training may be performed based on a method described in the following two papers.

Paper 1: Wataru Sakata, Tomohide Shibata, Ribeka Tanaka, and Sadao Kurohashi. 2019. FAQ Retrieval using Query-Question Similarity and BERT-Based Query-Answer Relevance. In Proceedings of the 42nd International ACM SIGIR Conference on Research and Development in Information Retrieval (SIGIR'19). Association for Computing Machinery, New York, NY, USA, 1113-1116.

Paper 2: Seo, J.; Lee, T.; Moon, H.; Park, C.; Eo, S.; Aiyanyo, I. D.; Park, K.; So, A.; Ahn, S.; Park, J. Dense-to-Question and Sparse-to-Answer: Hybrid Retriever System for Industrial Frequently Asked Questions. Mathematics 2022, 10, 1335.

The management unit 50 acquires an inquiry including one or more pieces of privacy information from the user terminal 1, and acquires knowledge information corresponding to the inquiry from the knowledge database 60, while masking the privacy information included in the inquiry. Further, the management unit 50 requests the large language model service 3 to generate an answer to the inquiry in which the privacy information is masked, and outputs an output text based on the answer via the network to the user terminal 1.

The input acquisition unit 51 acquires an inquiry including one or more pieces of privacy information based on input from the user. The inquiry may be text or may include information other than text. The input from the user is information input by the user by operating the user terminal 1 and received from the user terminal 1. The input acquisition unit 51 may acquire text as the input from the user as an inquiry as it is, or generate text as an inquiry by processing the privacy information and free text acquired interactively as the input from the user.

The privacy management unit 52 extracts the one or more pieces of privacy information included in the inquiry, and manages the extracted privacy information. The privacy extraction unit 58 included in the privacy management unit 52 extracts the privacy information included in the inquiry. When the inquiry includes the age of the user, the privacy extraction unit 58 selects an age range to which the age of the user belongs from a plurality of age ranges determined in advance. When the inquiry includes the age of the other person, the privacy extraction unit 58 selects the age range to which the age of the other person belongs from the plurality of age ranges determined in advance.

The association management unit 59 included in the privacy management unit 52 determines masked information corresponding to each of the one or more pieces of privacy information included in the inquiry. Further, the association management unit 59 stores each of the one or more pieces of privacy information included in the inquiry in the storage 22 in association with the masked information corresponding to the privacy information. The masked information is information which replaces the privacy information included in the inquiry. The masked information may be information (tag or dummy information) corresponding to a type of the privacy information (for example, name, age, gender, or medical history).

When the inquiry includes the age of the user, in order to determine the masked information, the association management unit 59 may select one of a plurality of ages (which may be random) within the age range selected by the privacy extraction unit 58 as a masked age for the age of the user. When the inquiry includes the age of the user and the age of another person, and those ages belong to the same age range, the association management unit 59 may select the masked age so that the masked age for the user and the masked age for the another person do not overlap.

The masking unit 53 replaces each of the one or more pieces of privacy information included in the inquiry with masked information different from the corresponding piece of privacy information. When the inquiry includes the age of the user, the masking unit 53 may replace the age of the user included in the inquiry with a masked age for the age of the user. Further, when the inquiry includes the age of another person, the masking unit 53 may replace the age of the another person included in the inquiry with a masked age for the age of the another person.

The knowledge acquisition unit 54 transmits a query based on the inquiry to the knowledge database 60, and acquires knowledge information retrieved based on the query from the knowledge database 60. When the inquiry includes the age of the user, the knowledge acquisition unit 54 acquires, from the knowledge database 60 that is a plurality of pieces of knowledge information stored in the storage 22, knowledge information relating to an age range to which the age of the user belongs. As used herein, "relating to an age range" may mean that the age range is included in a condition for applying the knowledge information, or that a character string that is included in the knowledge information indicates that the knowledge information relates to the age range.

The answer acquisition unit 55 requests the large language model to create an answer to the inquiry in which the privacy information has been replaced, and acquires the answer from the large language model. The answers may be in text. Here, the answer acquisition unit 55 may request the large language model to create, based on the knowledge information, an answer to an inquiry in which the privacy information has been replaced. The large language model may be connected to the inquiry management system 2 via the Internet. When the answer acquired from the large language model contains an inappropriate character string (for example, a URL), the answer acquisition unit 55 may filter out the character string from the answer and use the filtered answer in the subsequent processing.

The restoration unit 56 replaces the masked information included in the answer acquired from the large language model with the privacy information which has been replaced with the masked information in the inquiry. More specifically, when the answer includes masked information associated with any of the one or more pieces of privacy information included in the inquiry, the restoration unit 56 replaces that masked information with the privacy information stored in the storage 22 in association with the masked information.

The answer output unit 57 transmits information based on the answer in which the masked information has been replaced to the user. More specifically, the answer output unit 57 may process the answer in which the masked information has been replaced and transmit the processed answer to the user. The processing may be formatting of the text included in the answer, or may be adding a hyperlink to the knowledge information or information relating to the knowledge information to the answer. Further, the answer output unit 57 may determine whether or not the replaced or processed answer matches the acquired knowledge information. When it is determined that the replaced or processed answer matches the acquired knowledge information, the answer output unit 57 may add a hyperlink to the knowledge information or information relating to the knowledge information to the answer, and when it is determined that the replaced or processed answer does not match the acquired knowledge information, the answer output unit 57 may add a warning message to the answer. The answer output unit 57 may determine whether or not there is a match based on whether or not each of the plurality of words included in the answer is included in the words included in the knowledge information.

FIG. 3 is a flowchart for illustrating an example of the processing by the inquiry management system 2. In FIG. 3, processing by the management unit 50 is mainly illustrated.

First, the input acquisition unit 51 acquires an inquiry text including one or more pieces of privacy information based on information input from the user terminal 1 based on an operation by the user (Step S101). The inquiry text is an inquiry which mainly includes text.

FIG. 4 is a view for illustrating an example of an input screen to the inquiry management system 2. The screen illustrated in FIG. 4 is output to the user terminal 1. An inquiry text input by the user is displayed on the screen of FIG. 4. In the example of FIG. 4, the inquiry text is an introductory text about the user and his or her family members that the user inputs in order to select appropriate insurance. In the example of FIG. 4, the input acquisition unit 51 acquires a text input into one input field as an inquiry text. In addition, the input acquisition unit 51 may detect whether or not there are any missing items in the text input so far, and when a missing item is detected, cause the user terminal 1 to output information prompting input of the detected item. In this case, the input acquisition unit 51 may acquire the text input thereafter and generate the inquiry text from the text input up to that point. The inquiry information may include other privacy information, such as an image of the face of the user.

Next, the privacy extraction unit 58 identifies the privacy information included in the inquiry text (Step S102). The privacy extraction unit 58 also identifies the type of the privacy information included in the inquiry text. In the example of the at least one embodiment, examples of the type of the privacy information include the name, the age, the gender, the medical history, the marital status, and the telephone number of the user, and the name, the age, the gender, the medical history, the marital status, and the telephone number of the family members of the user. The types of privacy information which are actually handled may be some of those examples, or may be defined by different classification criteria. The privacy extraction unit 58 may extract proper nouns and nouns from the inquiry text by morphological analysis, and identify the privacy information and the type by comparing the extracted proper nouns and nouns with a dictionary created in advance. Further, the privacy information may be identified based on the output obtained when an inquiry text is input to a machine learning model trained with learning data which includes text and ground truth data including the position and the type of the privacy information included in the text.

FIG. 5 is a table for showing an example of privacy information extracted from an inquiry text. In the example of FIG. 5, the "field" column indicates the type of the privacy information, and the "value" column indicates the privacy information itself. FIG. 5 may further include information indicating the position of the privacy information in the inquiry text, and the type of the privacy information may be further divided based on user and family relationship categories.

When the privacy information is identified, the privacy extraction unit 58 converts the privacy information in accordance with the type of the privacy information, and determines query information (Step S103). When the privacy information identified from the inquiry text includes the age of the user (includes privacy information in which the type is the age of the user), the privacy extraction unit 58 selects an age range to which the age of the user belongs from a plurality of age ranges determined in advance. The plurality of age ranges are set such that there is no overlap or gap, for example, to 0-5 years, 6-17 years, 18-19 years, 20-29 years, 30-39 years, 40-49 years, 50-59 years, and 60-69 years. The privacy extraction unit 58 may convert gender and disease into codes.

FIG. 6 is a table for showing an example of a query based on privacy information. In the example of FIG. 6, the query includes items of an age range (age_range), a code indicating a gender (gender_code), and a code indicating a disease (disease_code).

The association management unit 59 determines masked information corresponding to each of the one or more pieces of privacy information included in the inquiry text, and stores the masked information in the storage 22 in association with the corresponding piece of privacy information (Step S104). The association management unit 59 determines the masked information corresponding to the privacy information in accordance with the type of the privacy information. Further, each piece of privacy information is stored in the storage 22 in association with the corresponding masked information. The association management unit 59 may determine masked information different from the privacy information for some types of the one or more pieces of privacy information included in the inquiry text.

When the inquiry text includes privacy information on the age of the user or another person (includes privacy information in which the type is the age of the user or the another person), the association management unit 59 selects any of the plurality of ages within the age range selected by the privacy extraction unit 58 for that age as the masked age for that age. The masked age relates to, in particular, age in the masked information. When the identified privacy information is the name, the address, or the telephone number of the user or another person (when the type is the name, the address, or the telephone number of the user or another person), the association management unit 59 may determine a dummy character string of the name, for example, associated with the type in advance as the masked information.

FIG. 7 is a table for showing an example of a relationship between privacy information and masked information. In FIG. 7, an example of the privacy information and the masked information stored in the storage 22 is shown. The column "relation" is a column indicating the type of the person who has privacy information, and together with the "field" column, indicates the type of the privacy information. The entry "self" indicates the user themselves, and "husband" indicates a male spouse. The column "original value" is a column indicating the privacy information included in the inquiry text, and "encoded value" is a column indicating the masked information. In FIG. 7, privacy information which in terms of its nature is not replaceable with masked information is also shown.

When the masked information is determined, the masking unit 53 replaces each of the one or more pieces of privacy information included in the inquiry with the masked information (Step S105). As a result, at least part of the privacy information is replaced with masked information different from the privacy information. The masking unit 53 may search for the character string of the privacy information extracted from the inquiry text, and replace the found character string with the character string of the corresponding masked information. The character string at the position of the privacy information may be replaced with masked information based on information indicating that position.

FIG. 8 is a view for illustrating an example of an inquiry in which privacy information has been replaced. In FIG. 8, a case in which the processing steps of Step S102 to Step S105 are performed on the inquiry text illustrated in FIG. 4 is illustrated as an example. Comparing FIG. 8 with FIG. 4, it can be seen that the name of the person and the ages of the person and the husband have been replaced with masked information.

Further, the knowledge acquisition unit 54 acquires knowledge information from the knowledge database 60 based on the query information determined in Step S103 (Step S106). The knowledge acquisition unit 54 may transmit a query based on the query information determined in Step S103 to the knowledge database 60 via an API, and the knowledge database 60 may acquire the knowledge information found based on that query search via the API. The knowledge information is input into the large language model, and used as the basis for the answer. The processing step of Step S106 may be executed in parallel with the processing steps of Step S104 and Step S105, or may be executed in a different order.

The answer acquisition unit 55 inputs, into the large language model, an instruction text including the knowledge information and an inquiry text in which the privacy information has been replaced, and acquires the output (answer) from the large language model (Step S107). The answer acquisition unit 55 requests the large language model to create an answer to the inquiry text by inputting the instruction text.

FIG. 9 is a view for illustrating an example of an instruction text input into the large language model. In FIG. 9, the character strings {article} and {user introduction} are illustrated, but in reality, knowledge information (for example, information on an insurance product) and the inquiry text are respectively set in the locations of those character strings. The instruction text illustrated in FIG. 9 is for requesting the large language model to generate, based on the inquiry information, an answer recommending an appropriate insurance product retrieved based on the privacy information. A hyperlink (URL) to the information may be input as knowledge information into the large language model, or when the purpose is to create an answer without specific knowledge information, it may not be required to acquire knowledge information or input knowledge information into the large language model.

The inquiry text included in the instruction text input into the large language model does not particularly include information which can identify an individual in the privacy information. Thus, it is possible to prevent such information from being passed on to the large language model service 3 including the large language model. As a result, the risk of privacy information being leaked by the large language model service 3 is significantly reduced, and it is also possible to easily comply with privacy-related rules. Further, through including dummy privacy information in the inquiry text as masked information, impact on the creation of the answer can be suppressed.

FIG. 10 is a view for illustrating an example of an answer output from the large language model. In FIG. 10, there is illustrated an example of an answer generated when an instruction text including the information illustrated in FIG. 8 and FIG. 9 and knowledge information on "cancer insurance A" has been input. In some cases, the large language model generates an answer which includes masked information, such as the name item, as illustrated in FIG. 10. Further, in some cases, an answer which includes masked information on the age and the medical history may be generated.

When an answer is acquired, the restoration unit 56 replaces each of the one or more pieces of masked information included in the acquired answer with the privacy information corresponding to the masked information (Step S108). For example, the restoration unit 56 searches whether or not the answer includes, for each of the one or more pieces of masked information stored in the storage 22 and associated with privacy information, the character string of the masked information. When the answer includes the character string of a piece of masked information, the restoration unit 56 replaces the character string with the privacy information associated with the piece of masked information.

When the masked information is replaced, the answer output unit 57 outputs, to the user terminal 1 operated by the user, information based on the answer in which the masked information has been replaced (Step S109). The answer output unit 57 outputs information obtained by processing the answer as information based on the answer.

FIG. 11 is a view for illustrating an example of an answer in which masked information has been replaced. In FIG. 11, there is illustrated an example of a case in which processing has been executed by the restoration unit 56 on the answer illustrated in FIG. 10, and a hyperlink to information relating to the knowledge information has been added. In the example of FIG. 11, the name written in the first line of the answer has reverted to the name of the user.

As described above, it is possible to prevent the leakage of privacy information by masking information relating to privacy from the inquiry text input into the large language model. However, in such a case, masked information is included in the answer output from the large language model, which can result in an unnatural answer. In the at least one embodiment, the masked information included in the answer reverts to the original privacy information, and as a result, it becomes possible for the inquiry management system 2 to output a natural answer. Further, by using masked information as dummy information that is more realistic, the answer generated by the large language model can itself be made more natural. In addition, in replacing an age with a dummy masked age, the masked age is set in the same age range, and moreover, the age ranges are set so as to match the age ranges in the knowledge information. As a result, it is possible to minimize the impact on an answer due to a change in age.

The masking method in the at least one embodiment is not limited to the example described above. For example, in place of dummy information corresponding to the type of the privacy information, a fixed character string like a tag indicating the type of the privacy information may be used as the masked information.

FIG. 12 is a view for illustrating another example of an inquiry text in which privacy information has been replaced. Through performing the processing steps of Step S102 to Step S105 on the inquiry text illustrated in FIG. 4, the inquiry text illustrated in the example of FIG. 12 is obtained. However, the masked information replacing the privacy information is not dummy information that resembles the actual privacy information, and the masked information is tag information indicating the type of the privacy information itself. In this case, in Step S104, the processing of selecting an age based on an age range is not performed, and the age in the privacy information may simply be associated with the tag of the masked information indicating the age. Further, in this example, the types of privacy information do not include user and family categories, and may simply be types such as name, age, gender, and medical history.

FIG. 13 is a view for illustrating another example of an instruction text input into the large language model. In actual practice, knowledge information (for example, insurance product information) and an inquiry text like that illustrated in FIG. 12 are set in the locations of the character strings {article} and {user_introduction} in FIG. 13, respectively. In the example of FIG. 13, unlike the example of FIG. 9, information explaining the meaning of the tags in the inquiry text is provided in the instruction text input into the large language model. Even in this case, it is possible to generate an answer without inputting sensitive privacy information into the large language model, and moreover, the quality of the answer can be ensured to some extent.

In the at least one embodiment, a large language model is used, but there are no particular limitations on the implementation of the language model or the scale of the number of parameters. One or more embodiments of the present invention is applicable to machine learning models (language models) which handle natural language.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system, comprising:
at least one processor; and
at least one memory device storing instructions which, when executed by the at least one processor, cause the at least one processor to:
acquire an inquiry including one or more pieces of privacy information based on input from a user;
identify each of the one or more pieces of privacy information included in the inquiry;

identify a type of privacy information for each of the one or more pieces of privacy information, using either morphological analysis or based on an output obtained when the inquiry is input to a machine learning model;

replace each of the one or more pieces of privacy information included in the inquiry with masked information different from the one or more pieces of privacy information;

request a language model to create an answer to the inquiry in which each of the one or more pieces of privacy information has been replaced, and acquire the answer from the language model;

replace the masked information included in the acquired answer with each of the one or more pieces of privacy information which has been replaced with the masked information in the inquiry; and transmit information based on the answer in which the masked information has been replaced to the user.

2. The information processing system according to claim 1, wherein the plurality of instructions cause the at least one processor to replace each of the one or more pieces of privacy information included in the inquiry with masked information corresponding to the type of each of the one or more pieces of privacy information.

3. The information processing system according to claim 2, wherein the type of the one or more pieces of privacy information includes at least a part of a name, an age, a gender, and a medical history.

4. The information processing system according to claim 1, wherein the plurality of instructions cause the at least one processor to store each of the one or more pieces of privacy information in a database in association with the masked information which has replaced a corresponding one of the one or more pieces of privacy information, wherein the plurality of instructions cause the at least one processor to replace, when the answer includes masked information associated with any of the one or more pieces of privacy information, the masked information with a corresponding one of the one or more pieces of privacy information associated with the masked information.

5. The information processing system according to claim 1, wherein the plurality of instructions cause the at least one processor to:

select an age range to which an age of the user belongs from a plurality of age ranges determined in advance when the inquiry includes the age of the user; and select one of a plurality of ages within the selected age range as a masked age for the age of the user, wherein the plurality of instructions cause the at least one processor to replace the age of the user included in the inquiry with the masked age for the age of the user.

6. The information processing system according to claim 5, wherein the plurality of instructions cause the at least one processor to randomly select one of the plurality of ages within the selected age range as the masked age for the age of the user.

7. The information processing system according to claim 5, wherein the plurality of instructions cause the at least one processor to acquire answer basis information based on at least a part of the one or more pieces of privacy information, the answer basis information being any of a plurality of pieces of answer basis information relating to an age range to which the age of the user belongs, wherein the plurality of instructions cause the at least one processor to request, based on the acquired answer basis information, a language model to create an answer to a question in which each of the one or more pieces of privacy information has been replaced, and acquire the answer from the language model.

8. The information processing system according to claim 1, wherein the plurality of instructions cause the at least one processor to replace only the each of the one or more pieces of privacy information included in the inquiry with masked information different from the one or more pieces of privacy information.

9. The information processing system according to claim 1, wherein the answer comprises a recommendation for an insurance product.

10. An information processing method, comprising:

acquiring, with at least one processor operating with a memory device in a system, an inquiry including one or more pieces of privacy information based on input from a user;

identifying each of the one or more pieces of privacy information included in the inquiry;

identifying a type of privacy information for each of the one or more pieces of privacy information, using either morphological analysis or based on an output obtained when the inquiry is input to a machine learning model;

replacing, with the at least one processor operating with the memory device in the system, each of the one or more pieces of privacy information included in the inquiry with masked information different from the one or more pieces of privacy information;

requesting, with the at least one processor operating with the memory device in the system, a language model to create an answer to the inquiry in which each of the one or more pieces of privacy information has been replaced, and acquiring the answer from the language model;

replacing, with the at least one processor operating with the memory device in the system, the masked information included in the acquired answer with each of the one or more pieces of privacy information which has been replaced with the masked information in the inquiry; and transmitting, with the at least one processor operating with the memory device in the system, information based on the answer in which the masked information has been replaced to the user.

11. A non-transitory computer readable storage medium storing a plurality of instructions, wherein when executed by at least one processor, the plurality of instructions cause the at least one processor to:

acquire an inquiry including one or more pieces of privacy information based on input from a user;

identify each of the one or more pieces of privacy information included in the inquiry;

identify a type of privacy information for each of the one or more pieces of privacy information, using either morphological analysis or based on an output obtained when the inquiry is input to a machine learning model;

replace each of the one or more pieces of privacy information included in the inquiry with masked information different from the one or more pieces of privacy information;

request a language model to create an answer to the inquiry in which each of the one or more pieces of privacy information has been replaced, and acquire the answer from the language model;

replace the masked information included in the acquired answer with each of the one or more pieces of privacy information which has been replaced with the masked information in the inquiry; and transmit information based on the answer in which the masked information has been replaced to the user.

* * * * *